(12) United States Patent
Tsai et al.

(10) Patent No.: US 11,615,761 B2
(45) Date of Patent: Mar. 28, 2023

(54) CALIBRATION METHOD FOR SPLICING DISPLAYS INCLUDING MULTIPLE DISPLAYS

(71) Applicants: BenQ Intelligent Technology (Shanghai) Co., Ltd, Shanghai (CN); BENQ CORPORATION, Taipei (TW)

(72) Inventors: Li-Ting Tsai, Taipei (TW); Yi-Ho Bai, Taoyuan (TW)

(73) Assignees: BenQ Intelligent Technology (Shanghai) Co., Ltd, Shanghai (CN); BENQ CORPORATION, Taipei (TW)

(*) Notice: Subject to any disclaimer, the term of this patent is extended or adjusted under 35 U.S.C. 154(b) by 126 days.

(21) Appl. No.: 17/399,042

(22) Filed: Aug. 10, 2021

(65) Prior Publication Data
US 2022/0172693 A1 Jun. 2, 2022

(30) Foreign Application Priority Data

Dec. 2, 2020 (CN) .......................... 202011391010.4

(51) Int. Cl.
G09G 5/02 (2006.01)
G09G 5/10 (2006.01)

(52) U.S. Cl.
CPC ................ G09G 5/02 (2013.01); G09G 5/10 (2013.01); G09G 2300/026 (2013.01); G09G 2320/0242 (2013.01); G09G 2320/0666 (2013.01); G09G 2320/0693 (2013.01); G09G 2360/04 (2013.01)

(58) Field of Classification Search
CPC ...... G09G 5/02; G09G 5/10; G09G 2300/026; G09G 2320/0242; G09G 2320/0666; G09G 2320/0693; G09G 2360/04
See application file for complete search history.

(56) References Cited

U.S. PATENT DOCUMENTS

| 2013/0258203 | A1* | 10/2013 | Atkins | H04N 25/134 |
| | | | | 348/708 |
| 2014/0152706 | A1* | 6/2014 | Park | G09G 3/2003 |
| | | | | 345/690 |
| 2015/0340009 | A1* | 11/2015 | Loeffler | G09G 5/04 |
| | | | | 345/1.3 |
| 2019/0206299 | A1* | 7/2019 | Kim | G09G 3/3233 |
| 2022/0027113 | A1* | 1/2022 | Kim | G06F 3/1446 |
| 2022/0319376 | A1* | 10/2022 | Shi | G09G 3/2003 |

FOREIGN PATENT DOCUMENTS

| CN | 103236251 | A | * | 8/2013 | |
| CN | 103236251 | A | | 8/2013 | |
| CN | 103354087 | A | * | 10/2013 | ............... G09G 5/10 |

(Continued)

Primary Examiner — Amare Mengistu
Assistant Examiner — Jennifer L Zubajlo
(74) Attorney, Agent, or Firm — Winston Hsu

(57) ABSTRACT

A calibration method for splicing displays including initializing a plurality of displays, obtaining the gamuts of the displays, setting a display with the smallest gamut among the displays as the reference display, adjusting the color temperature, brightness and six-axis hue and saturation of the reference display respectively to a reference color temperature, a reference brightness and reference RGB coordinates, and adjusting the displays according to the reference color temperature, the reference brightness and the reference RGB coordinates.

16 Claims, 6 Drawing Sheets

(56) References Cited

FOREIGN PATENT DOCUMENTS

| CN | 103354087 | A |   | 10/2013 |   |
|----|-----------|---|---|---------|---|
| CN | 105336286 | A | * | 2/2016  |   |
| CN | 105336286 | A |   | 2/2016  |   |
| CN | 108234975 | A | * | 6/2018  |   |
| CN | 109147713 | A | * | 1/2019  | ............... G09G 5/10 |

* cited by examiner

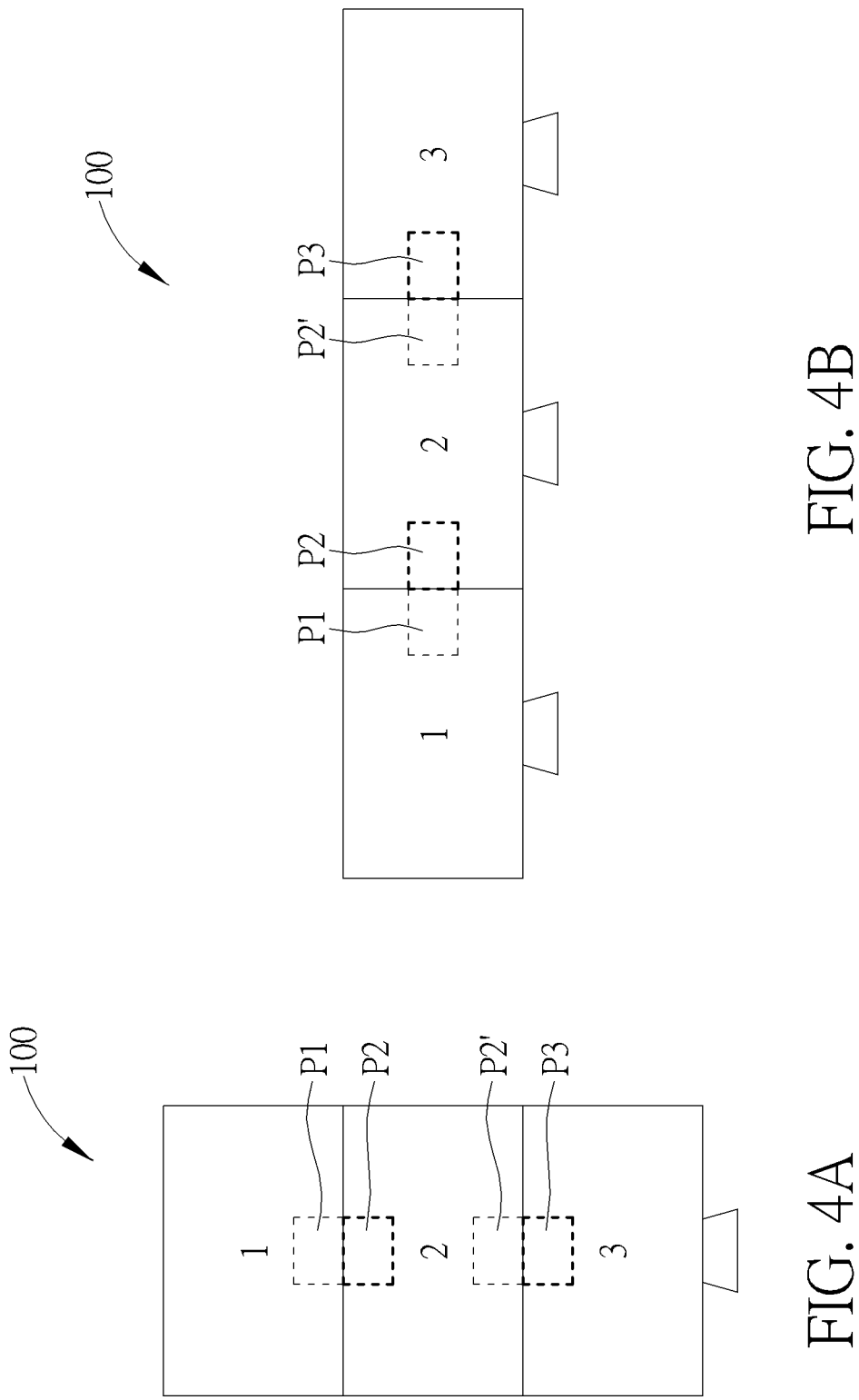

CALIBRATION METHOD FOR SPLICING DISPLAYS INCLUDING MULTIPLE DISPLAYS

CROSS REFERENCE TO RELATED APPLICATION

This non-provisional application claims priority of China patent application No. 202011391010.4, filed on 2 Dec. 2020, included herein by reference in its entirety.

BACKGROUND OF THE INVENTION

1. Field of the Invention

The invention relates to a color calibration method of a display, and in particular, to a color calibration method of a splicing display.

2. Description of the Prior Art

As economy grows, an increasing number of industries are committed to build digital infrastructure. The level of information visualization has been escalating to distribute information in aviation, railway, banks, exhibition and other public spaces, and provide security monitoring and facilitate production operations in large enterprises, media productions, hospitals, public safety and other fields. In particular, in monitoring centers, command centers, dispatch centers and other control centers, splicing display systems have become essential to facilitate development of the market.

The biggest problem faced in designing the splicing display system is color inconsistency resulted from individual differences between different display devices. Further, the color difference worsens as the result of variation of color depths between display devices and aging of the display devices. In order to resolve the problem of color differences, technicians have to adjust dozens of display devices one by one. This is a time-consuming and labor-intensive process, and subject to lack of a color reference standard, human errors due to visual recognition, and color performance variations of different display devices. The error after a calibration might be greater than visual perception of the human eye, even if the same standard has been used in the calibration. A user may easily perceive the color difference between adjacent display devices. Therefore, a method is in need to provide a consistent visual effect for multiple displays arranged side by side.

SUMMARY OF THE INVENTION

According to one embodiment of the invention, a color calibration method of a splicing display includes initializing a plurality of displays; obtaining gamuts of the plurality of displays; setting a display having a smallest gamut among the plurality of displays as a reference display; adjusting a color temperature, a brightness and a six-axis (RGBCMY) hue and saturation of the reference display to a reference color temperature, a reference brightness, and RGB corner coordinates of a reference gamut, respectively; and adjusting the plurality of displays according to the reference color temperature, the reference brightness, and the RGB corner coordinates of the reference gamut.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 4A and 4B are schematic diagrams of a calibration sequence of one-dimensional array arrangements according to an embodiment of the invention.

DETAILED DESCRIPTION

Figure 1A:
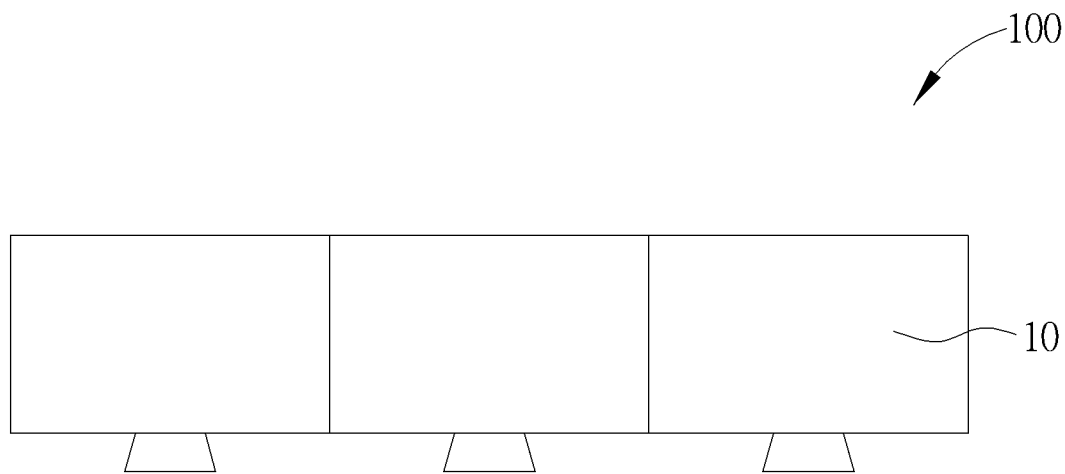
FIGS. 1A and 1B are schematic diagrams of an arrangement in a splicing display according to an embodiment of the invention.

The present invention may be understood by referring to the following detailed description with the accompanying drawings. It should be noted that, for clarity and simplicity of the drawings, various drawings in the present invention only depict a part of the electronic device, and the specific elements in the drawings are not drawn to scale. Further, the number and size of each element in the drawings are only for illustration, and are not used to limit the scope of the present invention.

Throughout the specification and the claims of the present invention, certain terms are used to refer to specific elements. Those skilled in the art should understand that the same elements may be referred to by electronic device manufacturers by different names. The disclosure does not intend to differentiate those components having the same function but different names.

In the following, the terms such as "containing" and "including" are open-ended words, so they should be interpreted as meaning "containing but not limited to . . . ".

The terms "approximately", "equal to", "equal" or "same", "substantially" or "approximately" are generally interpreted as being within plus or minus 20% of the given value, or interpreted as being within the range of plus or minus 10%, plus or minus 5%, plus or minus 3%, plus or minus 2%, plus or minus 1%, or plus or minus 0.5%.

While the terms "first", "second", "third" . . . may be used to describe various elements, the elements are not limited to these terms. These terms are only used to distinguish one element from another element in the specification. The same terms may not be used in the claims, and the elements in the claims may be replaced with first, second, third . . . according to the order in which the elements are declared. Therefore, the first element in the specification may be the second element in the claims.

The method described in various embodiments may visually achieve similar color temperature, brightness, hue and saturation of a large-area splicing display formed by splicing a plurality of displays.

Figure 1B:
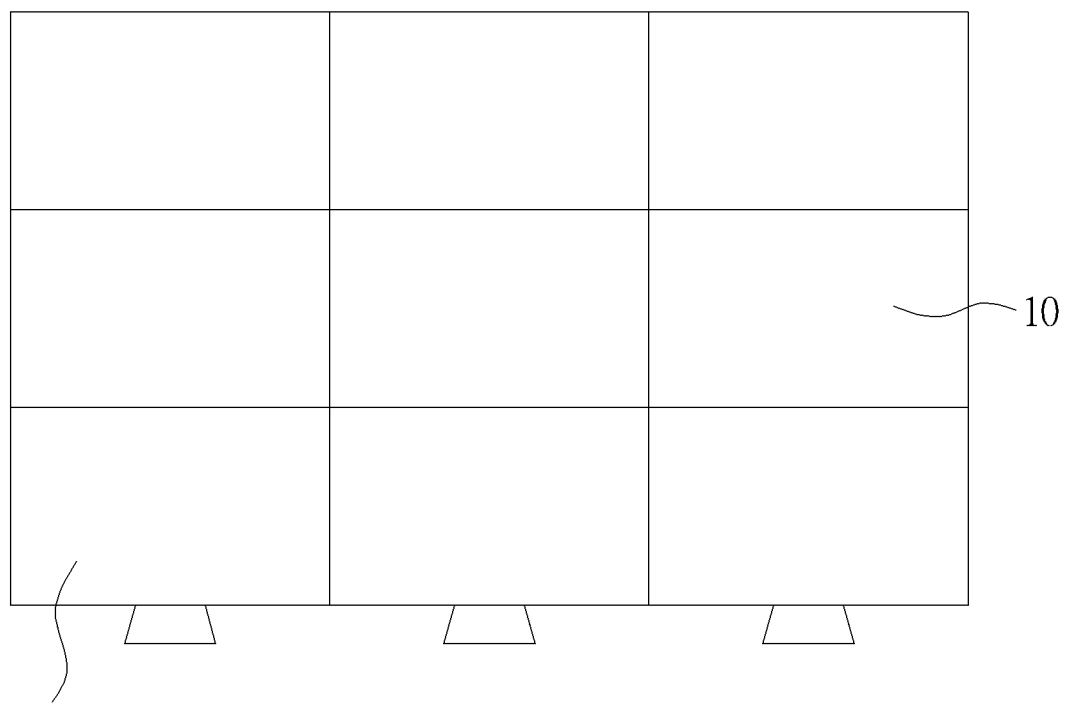

FIGS. 1A and 1B are schematic diagrams of an arrangement in a splicing display 100 according to an embodiment of the invention. An arrangement of the splicing display 100 may be one-dimensional (as in FIG. 1A) or two-dimensional (as in FIG. 1B). The splicing display 100 includes a plurality of displays 10. Each of the displays 10 may be any commercially available display that provides a six-axis (RGBCMY) color adjustment function, and may be a plasma display, a liquid crystal display, an organic light-emitting diode display, or the like. After the arrangement of the splicing display 100 is determined, a color calibration may be performed on each display 10 in the splicing display 100.

First, each display 10 may be initialized by adjusting a brightness and an RGB gain of the display 10 to maximum levels, and adjusting a hue and a saturation of the display 10 to preset values such as 50 or 60, so as to set each display 10 of the splicing display 100 to the same display reference.

Figure 2:
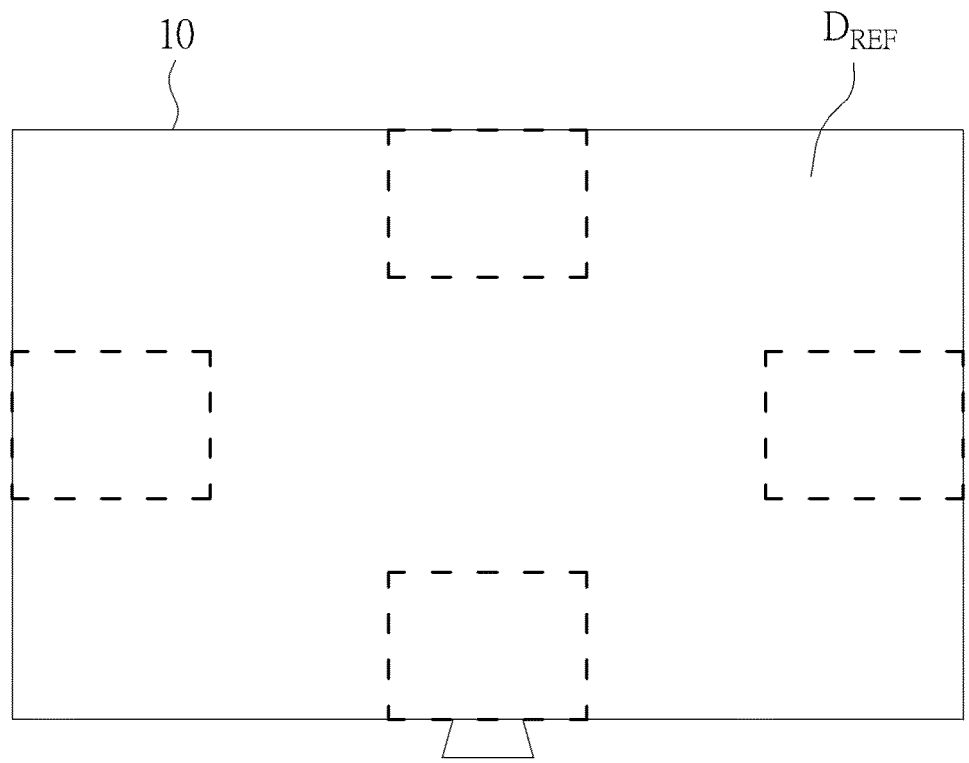
FIG. 2 is a schematic diagram of measuring a measurement position of the display using a color calibration device according to an embodiment of the invention.

FIG. 2 is a schematic diagram of measuring a measurement position of the display 10 using a color calibration device according to an embodiment of the invention. After initialization, each display 10 is measured using a color calibration device. As shown in FIG. 2, the measurement position may be the central portion of each display 10. The color calibration device may measure three-corner (RGB) coordinates of a gamut of the display 10, as well as a color temperature and a brightness thereof. The gamut of the display 10 may be computed from the RGB corner coordinates of the gamut measured.

After computing the gamut of each display 10 in the splicing display 100, the display having the smallest gamut is defined as the reference display $D_{REF}$. Then the color calibration device may be used to obtain the maximum adjustable brightness of the reference display $D_{REF}$. For example, if the display at the lower left corner of FIG. 1B is the display having the smallest gamut, the display will be defined as the reference display $D_{REF}$.

Next, a color temperature, a brightness and a hue and a saturation of the reference display $D_{REF}$ are adjusted to a reference color temperature, a reference brightness, and RGB corner coordinates of a reference gamut, respectively. The reference brightness is required to be less than the maximum adjustable brightness of the reference display $D_{REF}$, and the reference color temperature and the (RGB) three-corner coordinates of the reference gamut are required to be within a color range that can be accurately represented by the reference display $D_{REF}$. With reference to Table 1, a user may first set target values, and then calibrate the color temperature, the brightness and the RGB corner coordinates of the gamut of the reference display $D_{REF}$ to approximate to the target values. In Table 1, $W_Y$ is the brightness, $W_{xy}$ is the color temperature coordinate, ($R_{xy}$, $G_{xy}$, $B_{xy}$) are the RGB corner coordinates of the gamut, and ($C_{xy}$, $M_{xy}$, $Y_{xy}$) are CMY coordinates of the gamut. In addition, only the brightness, the color temperature and the RGB coordinates are calibrated at this stage. The CMY coordinates are the calibrated measurement for use as a reference in an adjustment in the next stage.

TABLE 1

| | Target value | Reference display $D_{REF}$ |
|---|---|---|
| $W_Y$ | 90 | 90.39 |
| $W_{xy}$ | 0.3127, 0.3290 | 0.314879, 0.328949 |
| $R_{xy}$ | 0.64, 0.33 | 0.639129, 0.329258 |
| $G_{xy}$ | 0.21, 0.71 | 0.209574, 0.708433 |
| $B_{xy}$ | 0.15, 0.06 | 0.148241, 0.0584565 |
| $C_{xy}$ | | 0.17129, 0.329814 |
| $M_{xy}$ | | 0.361357, 0.170887 |
| $Y_{xy}$ | | 0.428028, 0.516604 |

A method of adjusting the color temperature of the reference display $D_{REF}$ is detailed as follows. First a ratio of an adjusted color temperature value to a magnitude of a shift of the color temperature coordinates of the reference display $D_{REF}$ is estimated, the lower limits of the RGB gains of the display are computed, several sets of RGB gains are selected, e.g. RGB (85, 90, 95) and RGB (88, 92, 89), and then each of the selected sets to RGB gains is configured into the reference display $D_{REF}$ in turn, actual measurements of the color temperature coordinates of the reference display $D_{REF}$ are taken, and an RGB gain producing the color temperature coordinate of the display $D_{REF}$ closest to a target color temperature is selected. The selected color temperature is the reference color temperature. The color temperature coordinates ($W_{xy}$) are compared by computing weighted isosceles distances $D_w$ and selecting the minimum therefrom. The computation equation is expressed as follows:

$$l_x = |c_1(x) - c_2(x)|, \quad l_y = |c_1(y) - c_2(y)|$$

$$D = \sqrt{l_x^2 + l_y^2}, \quad l = \frac{D}{\sqrt{2}}$$

$$D_w = D + |l - l_x| + |l - l_y|$$

where $c_1$ and $c_2$ are the color temperature coordinate of the reference display $D_{REF}$ and the target color temperature coordinate, respectively, D is an isosceles distance of $c_1$ and $c_2$, and $D_w$ is the weighted isosceles distance.

A binary search or other approximation methods may be adopted to adjust the brightness ($W_Y$) of the reference display $D_{REF}$ to approximate the brightness of the reference display $D_{REF}$ to a target value, and the resultant brightness is the reference brightness.

Figure 3:
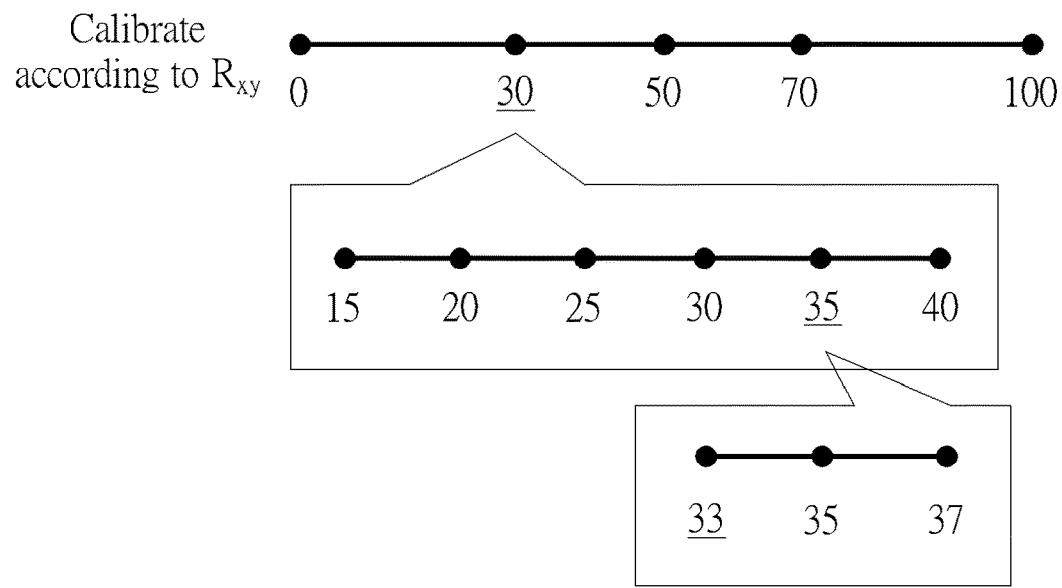
FIG. 3 is a schematic diagram of adjusting a hue and a saturation of the reference display in FIG. 1B according to an embodiment of the invention.

FIG. 3 is a schematic diagram of adjusting the hue and the saturation of the reference display $D_{REF}$ according to an embodiment of the invention. The adjustments of the hue and the saturation of the reference display $D_{REF}$ to approximate the RGB corner coordinates of the reference gamut of the display $D_{REF}$ to the RGB corner coordinates of a target gamut are explained as follows. Take the R-axis as an example, after target coordinates R are determined, the hue level of the R-axis of the reference display $D_{REF}$ may be adjusted to 0, 30th, 50th, 70th and 100th levels, and measurements of the coordinates $R_{xy}$ of the reference display $D_{REF}$ may be taken in turn after the adjustments, and the measured coordinates $R_{xy}$ of the reference display $D_{REF}$ and the target coordinates $R_{xy}$ may be compared. The comparison method is identical to that provided in the preceding paragraph. Weighted isosceles distances $D_w$ may be computed and the minimum of the Weighted isosceles distances $D_w$ may be determined. The computation equation is expressed as follows:

$$l_x = |c_1(x) - c_2(x)|, \quad l_y = |c_1(y) - c_2(y)|$$

$$D = \sqrt{l_x^2 + l_y^2}, \quad l = \frac{D}{\sqrt{2}}$$

$$D_w = D + |l - l_x| + |l - l_y|$$

where $c_1$ and $c_2$ are the coordinate $R_{xy}$ of the reference display $D_{REF}$ and the target coordinate $R_{xy}$, respectively, D is an isosceles distance of $c_1$ and $c_2$, and $D_w$ is a weighted isosceles distance.

If the minimum weighted isosceles distance $D_w$ is obtained by the hue level of 30 for the R-axis, then weighted isosceles distances $D_w$ are obtained for the 15th, 20th, 25th, 30th, 35th and 40th hue levels (each increment is 5 levels), and the coordinates $R_{xy}$ of the reference display $D_{REF}$ are measured and compared to the target coordinate $R_{xy}$ in turn. If the minimum weighted isosceles distance $D_w$ is obtained at the 35th level, then weighted isosceles distances $D_w$ are obtained for the 33rd, 35th, 37th hue levels (each increment is 2 levels), and the coordinates $R_{xy}$ of the reference display $D_{REF}$ are measured and compared to the target coordinate $R_{xy}$ in turn. If the minimum weighted isosceles distance $D_w$ is obtained at the 33rd level, then the hue of the R-axis is set at the 33rd level. When the hue of the R-axis is adjusted to the minimum $D_w$ obtained, the hue of the R-axis of the reference display $D_{REF}$ is the final adjusted value, and the final-adjusted coordinate R, is the reference coordinate $R_{xy}$. The method of adjusting the saturation is similar to the method of adjusting the hue, the explanation therefor is omitted for brevity.

After the adjustment for the R-axis is completed, the hues and the saturations of the G-axis and the B-axis of the reference display $D_{REF}$ may be adjusted in a similar manner. The adjusted RGB corner coordinates ($R_{xy}$, $G_{xy}$, $B_{xy}$) of the gamut of the reference display $D_{REF}$ after the adjustment are the RGB corner coordinates of the reference gamut. After adjusting the color temperature and reference brightness of the reference display $D_{REF}$, other displays may be calibrated according to the reference color temperature, the reference brightness and the RGB corner coordinates of the reference gamut.

FIGS. 4A and 4B are schematic diagrams of a calibration sequence of one-dimensional array arrangements according to an embodiment of the invention. The first display (labeled as "1") is the display at an edge of the splicing display 100. If the reference display is not the first display, the color temperature, the brightness, and the six-axis hue and saturation of the first display may be adjusted according to the reference color temperature, the reference brightness and the RGB corner coordinates of the reference gamut, respectively. The adjacent dotted frames in the displays are the measurement positions of the color calibration device. During the adjustment, a measurement result taken by the color calibration device from a measurement position P2 in the second display may be brought closer to a measurement result taken from an adjacent measurement position P1 in the first display, and a measurement result taken by the color calibration device from a measurement position P3 in the third display may be brought closer to a measurement result taken from an adjacent measurement position P2' in the second display. Compared to measuring the central position of the display, measuring the adjacent positions of two displays may improve the visual consistency of the splicing display 100.

Figure 4C:
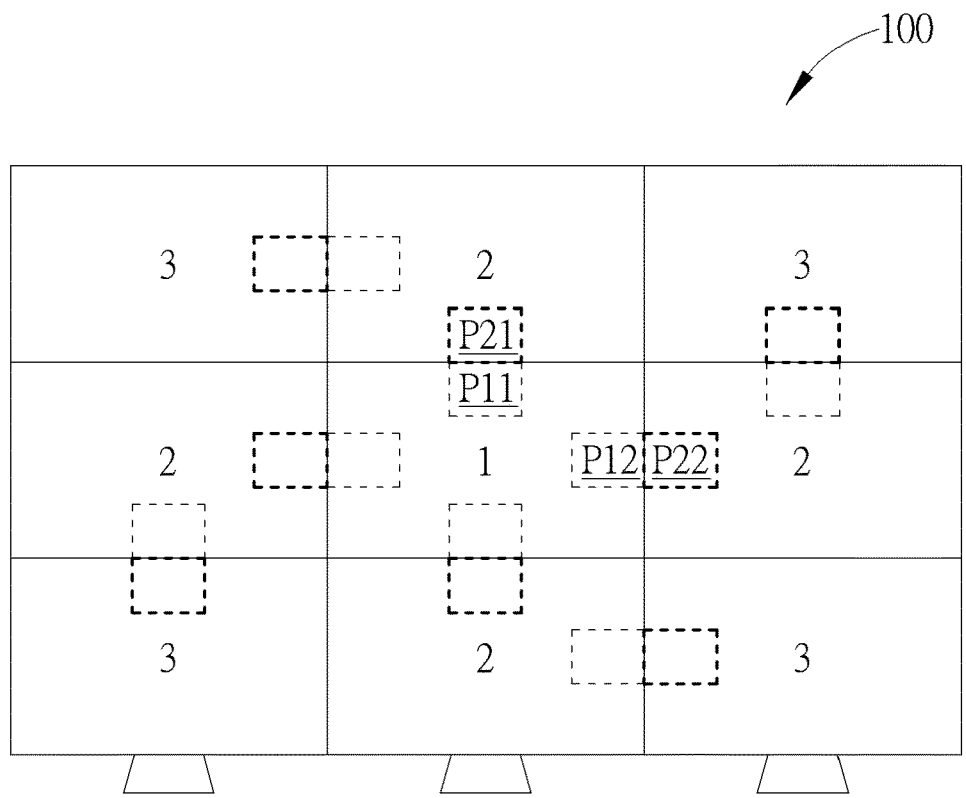
FIG. 4C is a schematic diagram of a calibration sequence of a two-dimensional array arrangement according to an embodiment of the invention.

FIG. 4C is a schematic diagram of a calibration sequence of a two-dimensional array arrangement according to an embodiment of the invention. The two-dimensional array arrangement is different from the one-dimensional array arrangement in that the center display of the two-dimensional assembly display is the first display (labeled as "1"), and remaining of the calibration method is the same. The first display is used as a reference to calibrate the second display (labeled as "2"), and the second display is used as a reference to calibrate the third display (labeled as "3"). That is, a measurement result taken by the color calibration device from a measurement position P21 in the second display may be brought closer to a measurement result taken from an adjacent measurement position P11 in the first display, a measurement result taken by the color calibration device from a measurement position P22 in another second display may be brought closer to a measurement result taken from an adjacent measurement position P12 in the first display, and so on.

Figure 5:
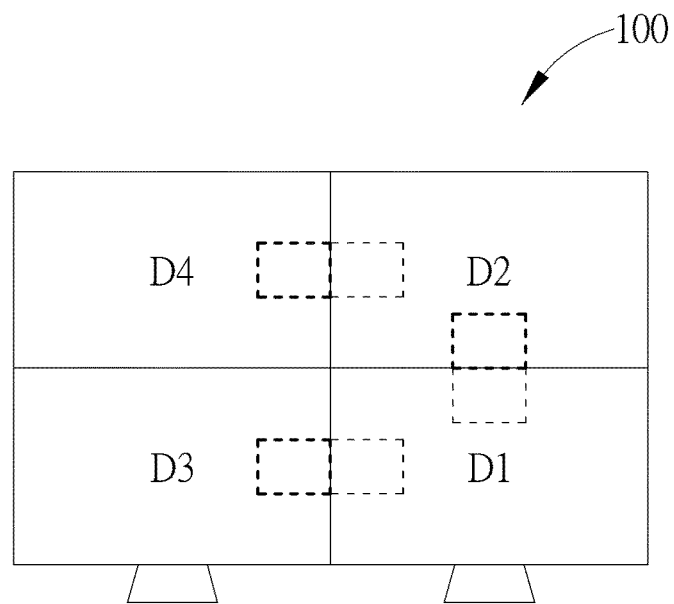
FIG. 5 is a schematic diagram of a calibration of a 2×2 array arrangement according to an embodiment of the invention.

FIG. 5 is a schematic diagram of a calibration of a 2×2 array arrangement according to an embodiment of the invention. Assuming that the reference display is the display D1, the embodiment uses the method to adjust the color temperatures, the brightnesses, hues and saturations of the display D2 and the display D3 according to the color temperature, the brightness and the RGB corner coordinates of the gamut of the display D1. The adjustment results of the display D1 and the display D2 are shown in Table 2.

TABLE 2

|  | Display D1 | Display D2 |
| --- | --- | --- |
| $W_Y$ | 91.0197 | 91.1936 |
| $W_{xy}$ | 0.315262, 0.332152 | 0.318155, 0.33018 |
| $R_{xy}$ | 0.638798, 0.330787 | 0.631913, 0.336398 |
| $G_{xy}$ | 0.210179, 0.708647 | 0.209614, 0.709672 |
| $B_{xy}$ | 0.14883, 0.0590061 | 0.148066, 0.0554671 |
| $C_{xy}$ | 0.171969, 0.32994 | 0.172813, 0.330791 |
| $M_{xy}$ | 0.362327, 0.172106 | 0.363693, 0.172991 |
| $Y_{xy}$ | 0.427841, 0.517726 | 0.435471, 0.510901 |
| $ExR_{xy}$ | 0.478901, 0.404714 | 0.476554, 0.410233 |
| $ExB_{xy}$ | 0.19746, 0.258554 | 0.196656, 0.258061 |
| $ExY_{xy}$ | 0.425879, 0.457561 | 0.432201, 0.451478 |

The calibration of a 2×2 array arrangement is different from calibrating the reference display $D_{REF}$ to approximate the same to the target value in that when adjusting the color temperature, brightness, hue and saturation of the display D2 using the calibration result of the display D1, the six-axis (RGBCMY) hue and saturation of the display D2 must be adjusted, and therefore, the gamut coordinates must include CMY coordinates ($C_{xy}$, $M_{xy}$, $Y_{xy}$), and the remaining of the adjustment method is identical to the adjustment of RGB coordinates. Later, the display D3 is adjusted according to the calibration result of the display D1, and the display D4 is adjusted according to the calibration result of the display D2, and the adjustment methods are identical.

In order to enhance the color consistency of the splicing display 100, as shown in Table 2, the adjusted gamut coordinates may further include other reference colors. The reference colors used in the embodiment are a skin color ExR (160, 90, 60), a sky color ExB (95, 175, 230), and a purple color ExY (255, 230, 100). Other than using the coordinate $R_{xy}$ as a reference to adjust the hue and the saturation of the R-axis, the coordinate $ExR_{xy}$ may also be used as a reference to further adjust the hue and saturation of the R-axis, as detailed below.

Figure 6:
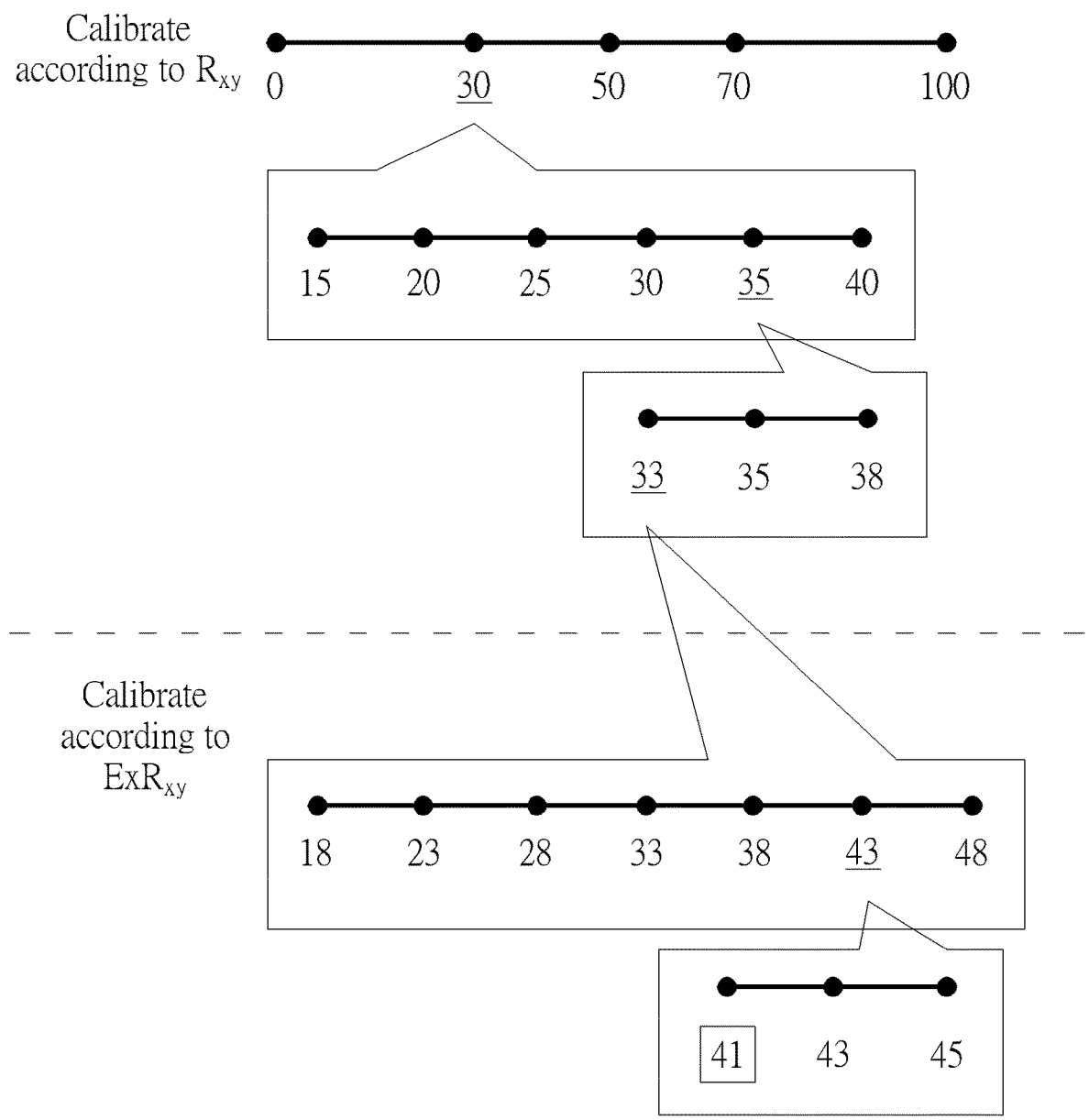
FIG. 6 is a schematic diagram of adjusting a hue and a saturation of the display in FIG. 5 according to an embodiment of the invention.

FIG. 6 is a schematic diagram of adjusting the hue and the saturation of the display D2 in FIG. 5 according to an embodiment of the invention. Take the displays D1 and D2 as an example, the coordinate $R_{xy}$ of the display D1 is used as a reference, after the hue of the R-axis of the display D2 is adjusted to the 33rd level, the coordinate $ExR_{xy}$ of the display D1 is used as a reference, with an interval between the (33−15)th level to the (33+15)th level being adopted, or equivalently, the 18th, 23rd, 28th, 33rd, 38th, 43rd, and 48th levels (each increment is 5 levels), the coordinates $ExR_{xy}$ of the display D2 are measure and compared with the coordinates $ExR_{xy}$ of the display D1 in turn. If the minimum weighted isosceles distance Dw is obtained at the 43rd levels, then weighted isosceles distances Dw are obtained for the hues of the 41st, 43rd, 45th levels (each increment is 2 levels), and the coordinates $ExR_{xy}$ of the reference display D2 are measured and compared to the target coordinate $ExR_{xy}$ of the display D1 in turn. If the minimum weighted isosceles distance Dw is obtained at the 41st level, then the hue of the R-axis is set at the 41st level. This is the final adjusted value of the hue level of the R-axis of the display D2. The RGBCMY coordinates are obtained by the color calibration device. The method of adjusting the saturation is similar to the method of adjusting the hue, the explanation therefor is omitted for brevity.

Figure 7:
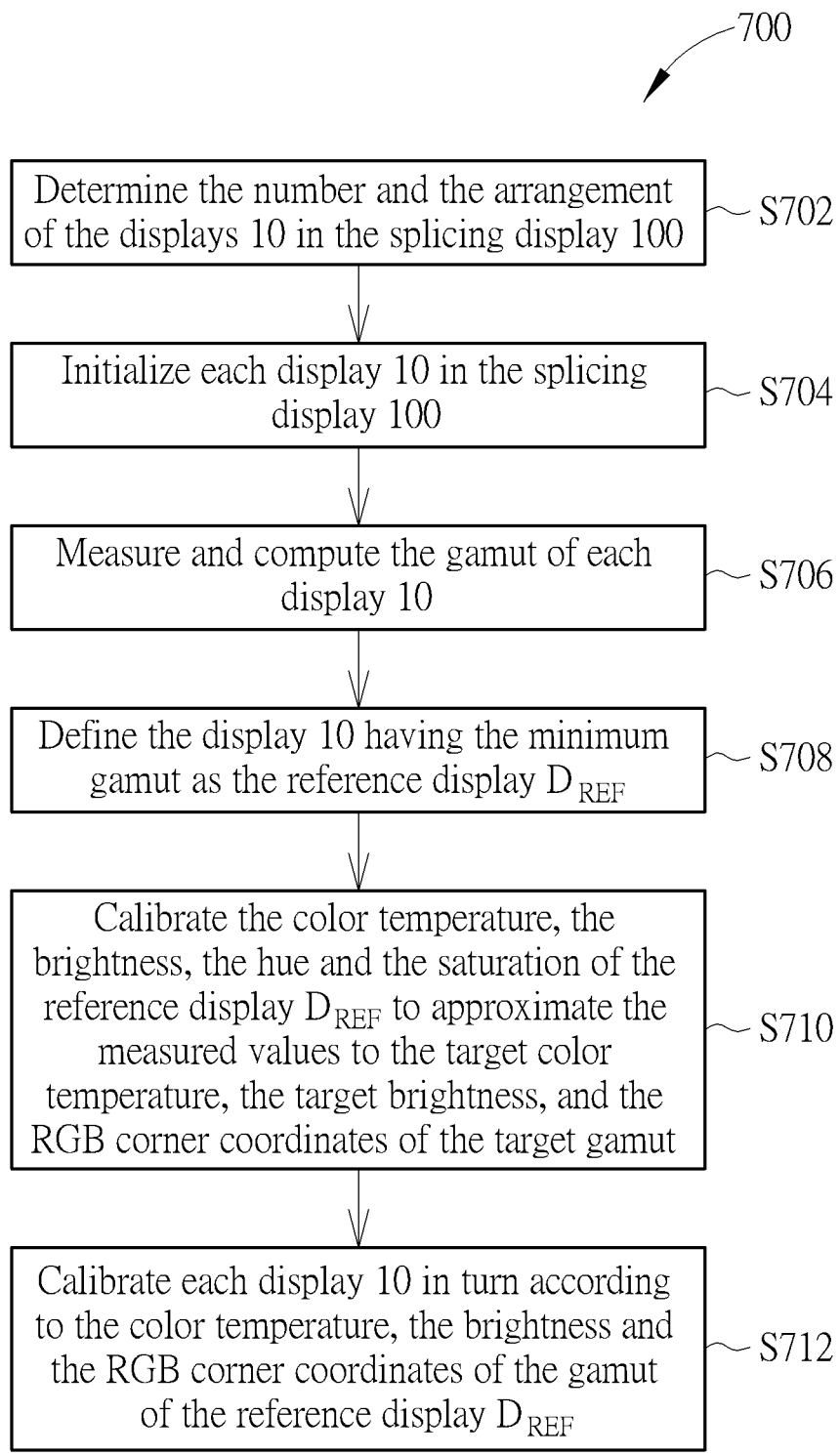
FIG. 7 is a flowchart of a calibration method of a splicing display according to an embodiment of the invention.

FIG. 7 is a flowchart of a calibration method 700 of a splicing display according to an embodiment of the invention. The color calibration method 700 of the splicing display includes the following steps.

S702: Determine the number and the arrangement of the displays 10 in the splicing display 100;

S704: Initialize each display 10 in the splicing display 100;

S706: Measure and compute the gamut of each display 10;

S708: Define the display 10 having the minimum gamut as the reference display $D_{REF}$;

S710: Calibrate the color temperature, the brightness, the hue and the saturation of the reference display $D_{REF}$ to approximate the measured values to the target color temperature, the target brightness, and the RGB corner coordinates of the target gamut;

S712: Calibrate each display 10 in turn according to the color temperature, the brightness and the RGB corner coordinates of the gamut of the reference display $D_{REF}$.

The color calibration method of the splicing display according to the embodiments of the invention may be applied where a large display is in need such as stores, transportation and exhibitions, and may also be adopted by image workers in need of large screens or non-conventional size displays. In addition, the splicing display may provide visual consistency and reduce a user's perception of the color difference between adjacent displays.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A color calibration method of a splicing display, comprising:
    initializing a plurality of displays;
    obtaining gamuts of the plurality of displays;
    setting a display having a smallest gamut among the plurality of displays as a reference display;
    adjusting a color temperature, a brightness and a six-axis (RGBCMY) hue and saturation of the reference display to a reference color temperature, a reference brightness, and RGB corner coordinates of a reference gamut, respectively; and
    adjusting the plurality of displays according to the reference color temperature, the reference brightness, and the RGB corner coordinates of the reference gamut
    adjusting a color temperature, a brightness, and a six-axis hue and saturation of a first display of the plurality of displays according to the reference color temperature, the reference brightness and the RGB corner coordinates of the reference gamut, respectively;
    wherein the color temperature of the first display is adjusted before adjusting the brightness of the first display, and the brightness of the first display is adjusted before adjusting the six-axis hue and saturation of the first display.

2. The method of claim 1, wherein adjusting the color temperature, the brightness, and the six-axis hue and saturation of the first display of the plurality of displays according to the reference color temperature, the reference brightness and the three-corner RGB corner coordinates of the reference gamut comprises:
    determining a plurality of sets of candidate RGB gains according to a lower limit of an RGB gain of the first display; and
    selecting a set of RGB gains from the plurality of sets of candidate RGB gains to approximate the color temperature of the first display to the reference color temperature.

3. The method of claim 1, wherein adjusting the color temperature, the brightness, and the six-axis hue and saturation of the first display of the plurality of displays according to the reference color temperature, the reference brightness and the three-corner RGB corner coordinates of the reference gamut comprises:
    adjusting the brightness of the first display to approximate the brightness of the first display to the reference brightness.

4. The method of claim 1, wherein adjusting the color temperature, the brightness, and the six-axis hue and saturation of the first display of the plurality of displays according to the reference color temperature, the reference brightness and the RGB corner coordinates of the reference gamut comprises:
    adjusting the six-axis hue and saturation of the first display to approximate RGB corner coordinates of a gamut of the first display to the RGB corner coordinates of the reference gamut.

5. The method of claim 4, wherein adjusting the six-axis hue and saturation of the first display to approximate the three-corner RGB corner coordinates of the gamut of the first display to the three-corner RGB corner coordinates of the reference gamut is adjusting a six-axis hue and a six-axis saturation of the first display, respectively.

6. The method of claim 1, wherein the reference display is the first display.

7. The method of claim 1, wherein:
    if the displays are arranged into a two-dimensional array, the first display is the display at a center of the two-dimensional array.

8. The method of claim 1, wherein adjusting the plurality of displays according to the reference color temperature, the reference brightness, and the RGB corner coordinates of the reference gamut further comprises:

adjusting a color temperature, a brightness, and a six-axis hue and saturation of a second display according to the color temperature, the brightness and the RGB corner coordinates of the gamut of the first display, respectively, the second display being adjacent to the first display.

9. The method of claim 8, further comprising:
adjusting a six-axis hue and saturation of the second display according to CMY coordinates of the first display.

10. The method of claim 8, wherein adjusting the color temperature, the brightness, and the six-axis hue and saturation of the second display according to the color temperature, the brightness and the RGB corner coordinates of the gamut of the first display is:
adjusting a color temperature, a brightness, and a six-axis hue and saturation of a first side of the second display according to a reference color temperature, a reference brightness and RGB corner coordinates of the reference gamut of a first side of the first display, respectively, the first side of the first display being adjacent to the first side of the second display.

11. The method of claim 10, wherein adjusting the plurality of displays according to the reference color temperature, the reference brightness, and the RGB corner coordinates of the reference gamut further comprises:
adjusting a color temperature, a brightness, and a six-axis hue and saturation of a first side of a third display according to a color temperature, a brightness and RGB corner coordinates of a gamut of a second side of the second display, respectively, the second side of the second display being adjacent to the first side of the third display.

12. The method of claim 1, wherein:
obtaining the gamuts of the plurality of displays is:
measuring a central portion of each of the plurality of the displays using a color calibration device to obtain a gamut thereof; and
setting the display having the smallest gamut among the plurality of displays as the reference display is:
setting the display having the smallest gamut at a side thereof among the plurality of displays as the reference display.

13. The method of claim 1, further comprising determining a quantity of the plurality of displays and an arrangement of the plurality of displays.

14. The method of claim 1, further comprising obtaining a maximum adjustable brightness of the reference display, wherein the reference brightness is less than the maximum adjustable brightness.

15. The method of claim 1, wherein initializing the plurality of displays comprises:
adjusting brightness and RGB gains of the plurality of displays to maximum levels thereof; and
adjusting hues and saturations of the plurality of displays to preset values.

16. The method of claim 1, wherein the color temperature, the brightness and RGB corner coordinates of the gamut of the reference display are obtained by a color calibration device.

* * * * *